United States Patent
Sellers-Blais (10) Patent No.: US 9,460,174 B2
(45) Date of Patent: Oct. 4, 2016

(54) METHOD FOR TRANSPORTING RELATIONAL DATA

(71) Applicant: IfWizard Corporation, Corvallis, OR (US)

(72) Inventor: Dominic Samuel Sellers-Blais, Corvallis, OR (US)

(73) Assignee: IFWizard Corporation, Coeur d'Alene, ID (US)

( * ) Notice: Subject to any disclaimer, the term of this patent is extended or adjusted under 35 U.S.C. 154(b) by 206 days.

(21) Appl. No.: 14/282,387

(22) Filed: May 20, 2014

(65) Prior Publication Data

US 2015/0339362 A1  Nov. 26, 2015

(51) Int. Cl.
*G06F 17/30* (2006.01)
*G06F 12/02* (2006.01)

(52) U.S. Cl.
CPC ......... *G06F 17/30569* (2013.01); *G06F 12/02* (2013.01); *G06F 17/30* (2013.01); *G06F 17/30595* (2013.01)

(58) Field of Classification Search
CPC ................... G06F 17/30569; G06F 17/30306; G06F 7/00; G06F 7/30
USPC .................................................. 707/802, 811
See application file for complete search history.

(56) References Cited

U.S. PATENT DOCUMENTS

| | | | |
|---|---|---|---|
| 6,240,428 B1 * | 5/2001 | Yeung et al. | |
| 6,490,598 B1 * | 12/2002 | Taylor | |
| 6,651,074 B1 * | 11/2003 | Taylor | 707/704 |
| 6,968,456 B1 | 11/2005 | Tripathi | |
| 7,548,898 B1 * | 6/2009 | Tarenskeen et al. | |
| 2008/0209444 A1 | 8/2008 | Garrett | |
| 2013/0191650 A1 | 7/2013 | Balakrishnan | |
| 2014/0006342 A1 | 1/2014 | Love | |

FOREIGN PATENT DOCUMENTS

WO    2013174452 A1    11/2013

OTHER PUBLICATIONS

T. Chiueh et al., Design, implementation, and evaluation of a repairable database management system, 2004, IEEE, 179-188.*
United State Patent and Trademark Office (ISA); International Search Report and Written Opinion PCT/US15/17763; Jul. 24, 2015; 14 pages.

* cited by examiner

*Primary Examiner* — Jean B Fleurantin
(74) *Attorney, Agent, or Firm* — Schwabe, Williamson & Wyatt P.C.

(57) ABSTRACT

A method for transporting relational data from one relational database to another such database. The data transported may be a subset of data in the entire database and the relations between the root of this data and other data entities are preserved in a way allowing their reconstruction in the target database. This preservation, itself further directed through configuration, is able to recreate new data identifiers without collision, yet also without requiring maintenance of the original identifiers.

8 Claims, 9 Drawing Sheets

METHOD FOR TRANSPORTING RELATIONAL DATA

COPYRIGHT NOTICE

©2014 IFWIZARD CORPORTION. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Database management systems (DBMS) provide centralized structured information services to client programs. The data within a DBMS is defined, stored, and retrieved according to certain basic information storage patterns known as data models. For example, a DBMS using a hierarchal data model would relate data entities within it through a tree-like structure with each entity having a single "parent" entity (or no parent, for the "root" entity) and any number of "child" entities. This hierarchal data model is used in the popular XML data format and for XML databases.

The most common DBMS data model for sophisticated computerized information is the relational data model, which is used by relational database management system (RDBMS). Relational data can be understood as a set of two-dimensional data tables with rows representing data entities and columns representing entity properties. Rows typically have a key column that identifies each row or entity uniquely. These keys are most often a positive integer incremented with each subsequently inserted row. Because table rows may be identified solely through their keys, a row in table A can "relate" to a row in table B by including a column with a key from table B.

By using these row identifiers for relations between tables, all data for a row, other than the row identifier itself, does not need to be duplicated and may be stored only in its canonical table. For example, a table of customers may contain street address information. When referring to this customer, such as in a list of sales orders, only the customer row identifier is required, as described before; the customer address does not need to be duplicated within the customer portion of the sales order. One of the major advantages of these normalized intra-table relations is that the customer address may be modified by only changing its information in the customer table as there are no duplicate inclusions of the customer address (i.e. in the sales orders) to maintain.

Row identifiers are typically automatically generated by the RDBMS as a simple incrementing positive number such as 1, 2, 3, and so on. As these identifier sequence generators are distinct from the tables themselves, if two databases share the same types of tables and columns, the row identifiers may be different between the two databases despite having identical content. These differences can arise from the order, number, and deletion history of the table rows. For example, if three customers were added in opposite order in two databases, likely zero, but no more than one row would have identical row identifiers across the databases.

While an RDBMS provides benefits of reduced storage size, improved data consistency, and, for some operations, higher query performance, its data model is extremely dependent upon correct and consistent use of the row identifier keys. Since data duplication is reduced or even eliminated, if the correct row is not related through the row identifier, there is no recourse to recover the correct row by examination of included duplicate data. For example, a sales order would contain only the customer row identifier and not additional customer columns such as their name or street address which would allow cross-referencing. Furthermore, mistaken row identifiers have a high likelihood of not merely referring to missing rows in another table, but may relate extant, but incorrect rows.

A DBMS typically runs on a single server in a single location, although more esoteric varieties are sometimes transparently spread among locations. As a RDBMS contains two principle parts, (1) the data tables describing and defining the data structure, and (2) the data rows which conform to the model so described, a server may likewise be seen as both the defining container and the content so contained. While interaction between completely distinct databases (i.e. both the tables and the data are distinct) is possible, there are a number of situations where multiple RDBMS servers are operational with the same table definitions, though the data they hold may be the same or different. In these same-definition scenarios, there may be a need to transport data between the database servers.

One such scenario is representing a multitude of software installations through a multitude of database servers. For example, stores in multiple locations may all have the same sales-tracking software installed, but each have their own database server to track their local sales data. In this case, one may want to move partial data, such as a customer and their related records such as order history, from one installation to the server of another installation. Another scenario involves duplicating the same data in several different database servers, perhaps located in different regions, to allow continued availability and security. A third scenario is the use of data within one database server as the template for new data insertion in another server. A variation of this scenario is the use of such a template within the original database server.

From the aforementioned particulars about relational databases, there emerge four major difficulties in accomplishing the above transportation of tabularly identical data between and within an RDBMS:

(1) The transported data row identifier cannot be safely used in the new database due to collisions with existing identifiers and missing relations.
(2) The transported row may be the required relation or require relation with additional rows that should be transported as well. For example, transporting a product row may require supplier (relation to the product) or support history (relation from the product) rows.
(3) As the previous row identifier cannot be safely used, new row identifiers must be allocated as part of transportation.
(4) Given these new, different row identifiers, all necessary related data transported with the primary row must be re-related using the new row identifiers.

Because of these difficulties, transportation between relational databases is typically restricted to three scenarios, all limited in practice. These three limited scenarios are:
(1) A database may be completely duplicated or "cloned" into a second database. This is a destructive process in which all existing data in the second database must be completely erased. This is the typical technique by which a database is backed up and restored.
(2) A custom program may be written to collect the specific rows necessary and then insert them into the second database. This technique allows for partial data transport, but is entirely specific to the section of data, database, and intended application as it requires a unique program for each section of data transported and must be synchronously maintained to match any changes to the table definition or intention.

(3) In certain cases the data may be exported out to an intermediate format, such as CSV (Comma Separated Value) format, and then reimported. As the intermediate format typically lacks the full expression of relations and dependencies, this scenario is of limited use except for very simple data transportation such as for rows that are neither related to nor from which are related.

As these scenarios all demonstrate considerable restrictions of specificity, application, or scope, there presently exists no general solution for transportation of relational data, in particular for partial interrelated subsets of a RDBMS.

SUMMARY OF THE INVENTION

The following is a summary of the present disclosure in order to provide a basic understanding of some features and context. This summary is not intended to identify key/critical elements of the invention or to delineate the scope of the invention. Its sole purpose is to present some concepts of the present disclosure in a simplified form as a prelude to the more detailed description that is presented later.

Accordingly, it is an object of the present disclosure to provide a general method for transporting data within a relational database. The data to be transported may be any row within any table that has an arbitrary row identifier. All other data dependent on the transported row as well as all other data the transported row depends upon will be automatically determined and transported along with the given row. The method further permits optional specification of tables to be ignored in the transportation, allowing for non-essential or otherwise functionally unneeded data to be omitted.

It is also an object of the present invention to provide an intermediate format for the transported data that allows for complete reconstruction of the transported data including all attached relations. This transport format supports the secure masking of the original row identifiers through consistent substitution of a random key cipher. These temporary keys are then replaced during the subsequent reconstruction of importing.

In accordance with the present disclosure, the intermediate format is reconstructed in a sequence and way that preserves the original internal relational identity while grafting the data onto a new database and stock. During this importing process the method allows specific substitution of row-column values, allowing for complex integration of the new data without explicit analysis and alteration of the reconstruction.

The invention is intended to be implemented in software; i.e. in one of more computer programs, routines, functions or the like. Thus it may best be utilized on a machine such as a computer or other device that has at least one processor and access to memory, as further described later. Accordingly, in this description, we will sometimes use terms like "component", "subsystem", "routine", or the like, each of which preferably would be implemented in software.

Additional aspects and advantages of this invention will be apparent from the following detailed description of preferred embodiments, which proceeds with reference to the accompanying drawings.

BRIEF DESCRIPTION OF THE DRAWINGS

In order to describe the manner in which the above-recited and other advantages and features of the disclosure can be obtained, a more particular description follows by reference to the specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

The following detailed description refers to the accompanying drawings. Wherever possible, the same reference numbers are used in the drawings and the following description to refer to the same or similar elements. For clarity and simplicity, not all characteristics of practical embodiments are described in the specification. However, it is appreciated that many embodiment-specific decisions have to be made in developing the practical embodiments in order to achieve a particular object of the developer. While embodiments of the invention may be described, a person skilled in the relevant art would recognize that modifications, adaptations, and other implementations are possible without parting from the spirit and scope of the invention. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, proper scope of the invention is defined by the appended claim.

Figure 1:
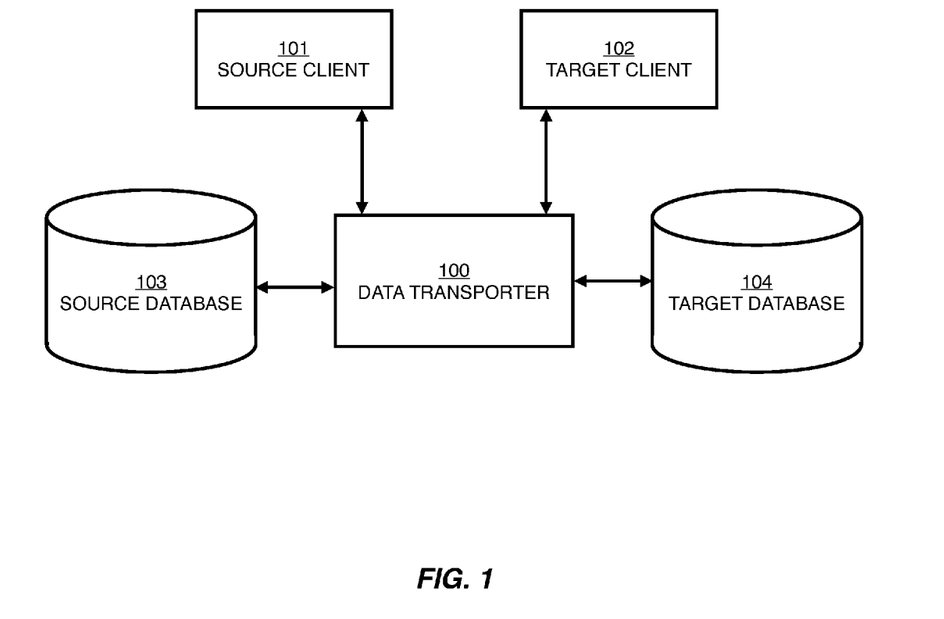
FIG. 1 depicts the functional components consistent with the present disclosure.

FIG. 1 depicts the function components of the present embodiment of the method. The data transporter component 100 provides movement of data between a source database 103 and a target database 104, which are RDBMS instances running on the same or different machines. The export of data from the source database 103 through the data transporter 100 is initiated and directed by a source client 101 which may be a computer application, program library routine, or other machine or system. The import of this exported data into the target database 104 is initiated and directed by a target client 102 which, likewise, may be a computer application, program library routine, or other machine or system. In the exemplary embodiment, the data transporter 100 is accessible through an Application Programming Interface (API) library to computer applications as source 101 and target 102 clients for use with a variety of relational databases through a common database connection library.

Figure 2:
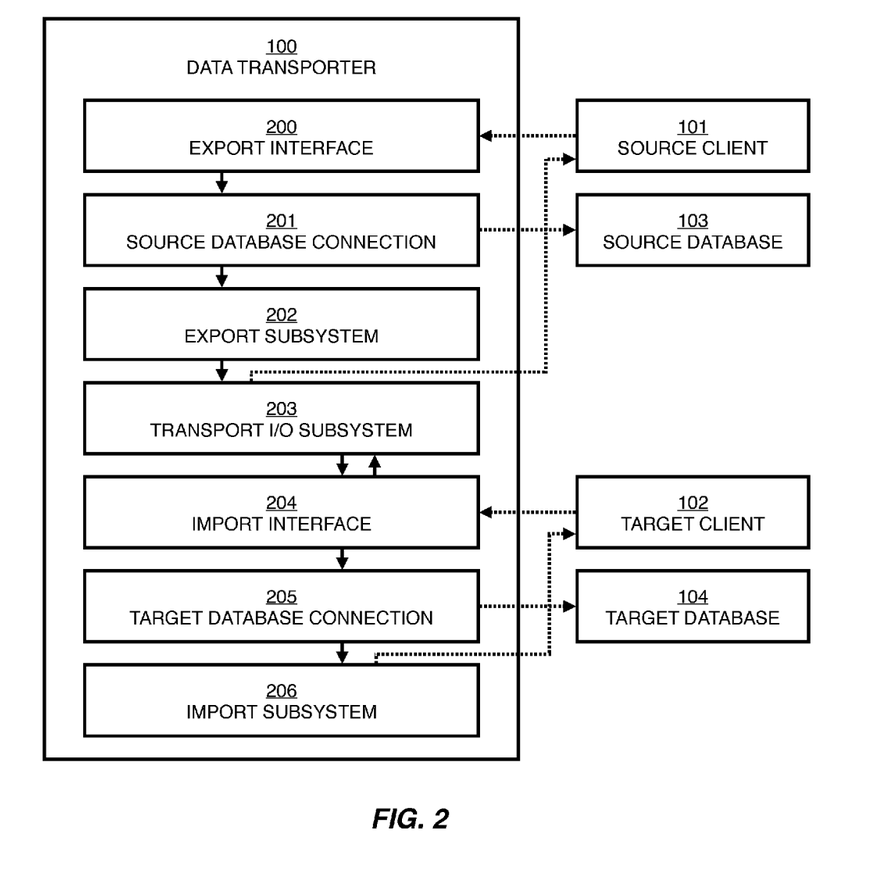
FIG. 2 illustrates the functional subcomponents of the data transporter of FIG. 1.

FIG. 2 illustrates the functional components of the data transporter 100 depicted in FIG. 1. The source client 101 has access to the export interface 200, specifying the necessary parameters including source database 103 connection information. The source database connection 201 can establish connection with the source database 103 and provide this access to the export subsystem 202 where the bulk of the export phase takes place.

Using the internal export representation generated by the export subsystem 202, the transport input/output subsystem 203 can provide the source client 101 with a data file representing the transported data. This data file is later provided by the target client 102 via the import interface 204 to the transport input/output subsystem 203 for translation into an internal representation.

The target client 102 has access to the import interface 204, specifying the necessary parameters for reconstruction in the target database 104 and a data file produced previously by the transport input/output subsystem 203. The target database connection 205 establishes the connection to the target database 104 and the import subsystem 206 uses an internal representation of the data file created through the transport input/output subsystem 203 to reconstructively import the data into the target database 104, returning graft point information to the target client 102.

Figure 3:
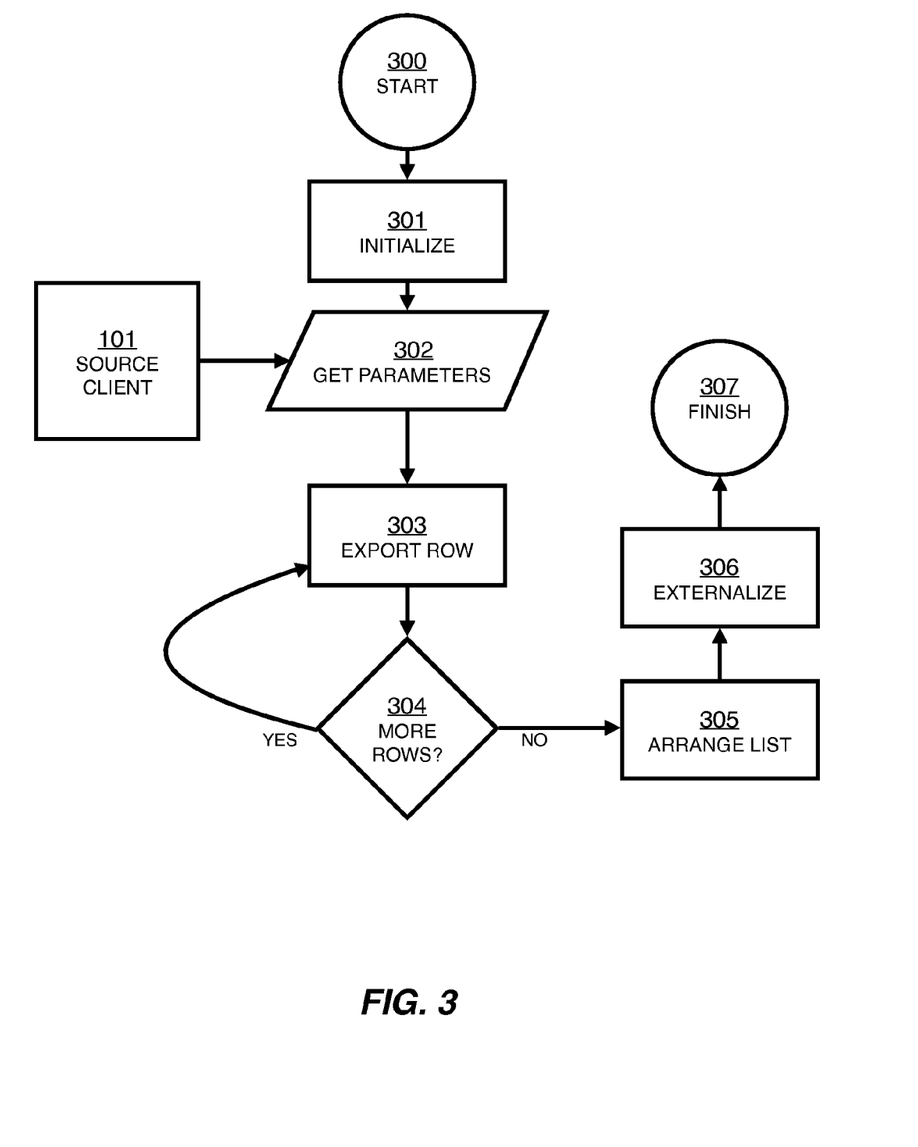
FIG. 3 illustrates the flow of activity during the data export phase of FIG. 1.

FIG. 3 illustrates the flow of activity during the data export phase. Upon starting 300, the export subsystem 202 initializes 301, creating internal structures for storing all necessary data operations and configurable variables. In the exemplary embodiment, initialization 301 includes the generation of a message digest service and a unique encoding key for use during row export 303. After initialization 301, the source client 101 specifies parameters 302 including the initial row identifier and table to export and an optional list of omitted tables. While the export phase typically starts 300 in response to activity by the source client 101 but could be continually available without actively exporting by operating as a service or user application and inputting parameters 302 as needed.

The central loop of the export subsystem 202 begins by exporting 303 the initial row specified in the parameters 302. If the export process 303 determines more rows 304 require exporting, the row export 303 is performed for the additional rows until no more rows require exporting. When all rows have been exported, they are arranged 305 into a list in a sequence that will allow them to be reconstructed progressively during import.

The process is finished 307 when this row list is converted into the external storage format 306. This conversion through the transport input/output subsystem 203 allows the data file to be provided to the source client 101.

Figure 4:
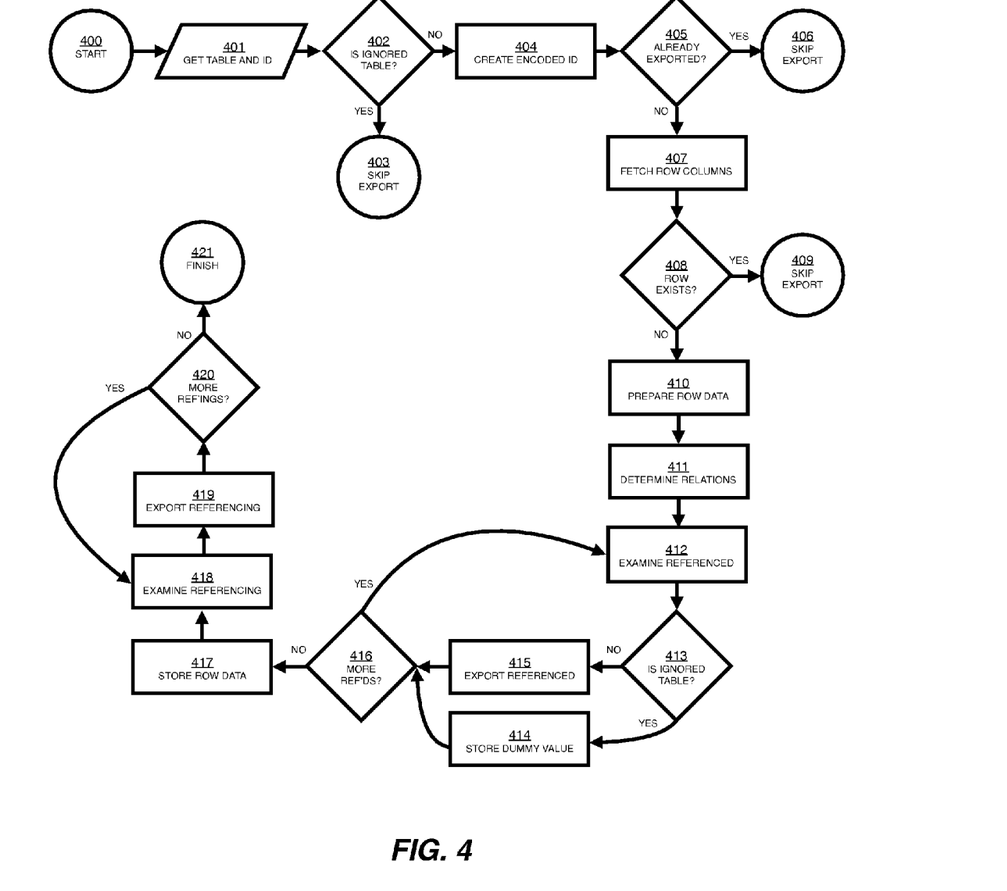
FIG. 4 illustrates the encoding of a data row during data export.

FIG. 4 illustrates the encoding of a data row during the data export process 303. When the encoding starts 400 the row's table and identifier 401 are used as parameters. If the table is ignored 402, export of the row is skipped 403. An encoded row identifier substitute is created 404 which is unique and traceable to the table and the original row identifier. If this encoded identifier is already stored 405, then the export of the row is skipped 406.

The columnar data of the row is fetched 407 from the source database 103. If the row identifier is found to not exist 408, export of the row is skipped 409. Otherwise, the columnar data is processed into an internal representation prepared 410 for the transport input/output subsystem 203.

The relations to and from the given row are determined 411 and each row referenced by the exporting row is examined 412. If the referenced row is from an ignored table 413, a dummy value is stored 414 into the internal representation for later detection during import. Otherwise, the referenced row is exported and its resulting encoded identifier (or existing encoded identifier if it has already been exported) is stored into the internal representation. If more referenced rows exist 416 these are also examined 412.

When the referenced row loop is complete, the internal representation is then stored 417 into the collection of existing encoded data and encoded identifiers. The rows which are referencing the exporting row are then examined 418 with each such row being exported 419 until no more referencing rows 420 need exporting. The process finishes 421 returning the encoded identifier, which has use during the internal exporting 415 of referenced rows.

Figure 5:
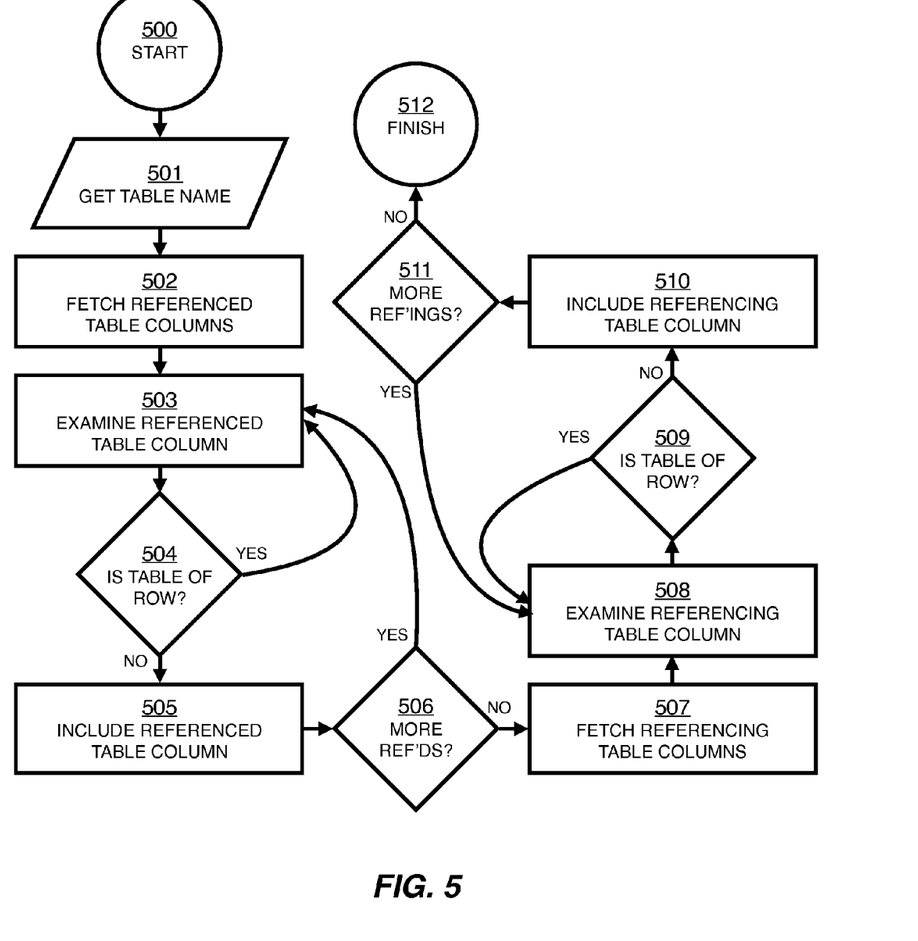
FIG. 5 illustrates the process by which dependent data is determined during data export.

FIG. 5 illustrates the process by which the dependent data is determined during the data export process 303. Upon process start 500 the table name is received as a parameter 501. The metadata of the source database 103 is accessed to retrieve 502 the pertinent columns for all tables referenced by the row's table. The referenced table column is examined 503 and, if the table is the same as that of the exporting row, if it is skipped 504, otherwise the referenced table column is included 505 among the dependencies. This test-and-include process is repeated 506 for each referenced table column.

Likewise, those columns which reference the exporting table are retrieved 507 from the source database 103. Each column is examined 508, skipped 509 if it is of the same table as the exporting row, and, otherwise, included 510. This is repeated 511 until no more columns remain and the process if finished 512.

Figure 6:
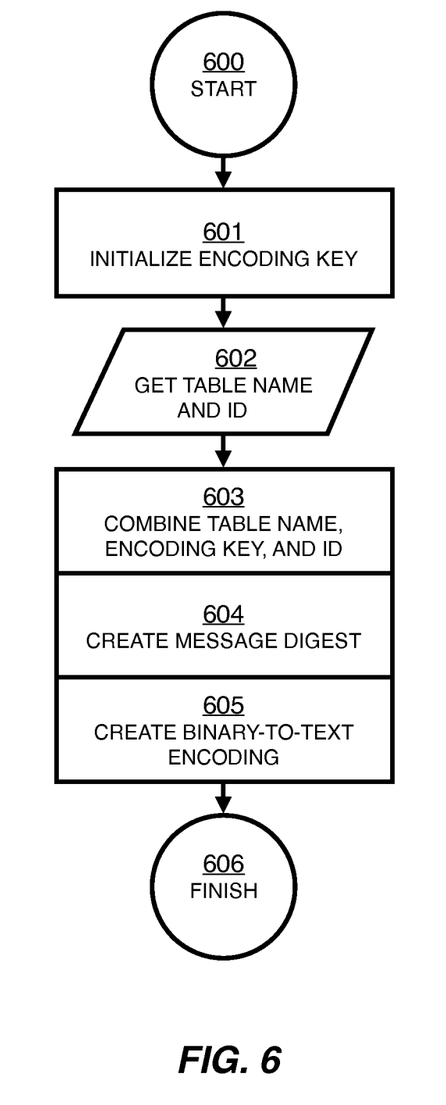
FIG. 6 illustrates the generation of portable row identifier substitutes during data export.

FIG. 6 illustrates the generation of portable row identifier substitutes during the data export process 303. The process starts 600 and generates 601 a random encoding key using a psuedo-random number generator (PRNG) and the current timestamp. This encoding key is persisted throughout the exporting of all rows during the export phase, but is never retained in the exported file or otherwise transmitted to the import phase.

Upon receiving 602 the table name and row identifier of the row to be encoded, the table name, encoding key, and row identifier are combined 603 together. The resulting text string is used as input for a message digest algorithm such as MD5, creating a binary message digest 604. This digest is then converted 605 into an ASCII text format using a binary-to-text encoder such as Base64, thereby completing 606 the key generation.

This process produces keys that are consistently the same with the same table name and row identifier and thereby allowing for functional comparison. But, upon disposal of the encoding key, the original identifiers are very difficult to determine even with a large pool of contemporaneously exported keys.

Figure 7:
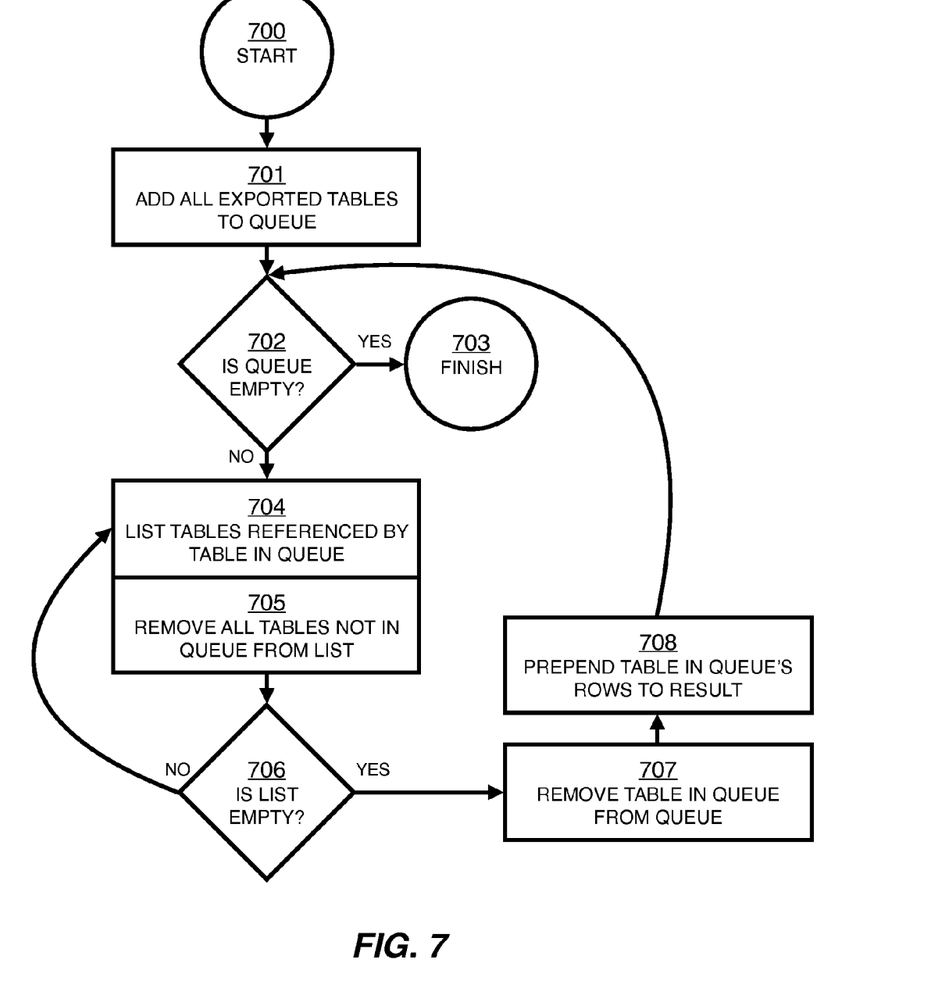
FIG. 7 illustrates the arrangement of export data into a reconstructable sequence.

FIG. 7 illustrates the arrangement of export data into a reconstructable sequence 305. The exported rows having been accumulated previously per their tables, when the process starts 700, all such tables containing exported rows are added 701 to a queue. This queue, reduced during the arranging loop, is tested 702 for being empty of tables. If the queue is empty, the arrangement process is finished 703.

If the queue is not empty, the table is drawn from the queue and all tables referenced by it are added to a new list 704. If the list of tables contains any tables that are not presently in the queue, said tables are removed 705 from the list. If the resulting list is not empty 706, the list test proceeds for the next table within the queue. However, if the list is empty, the table from the queue is removed from the queue 707 and its rows are prepended 708 to the result list.

Figure 8:
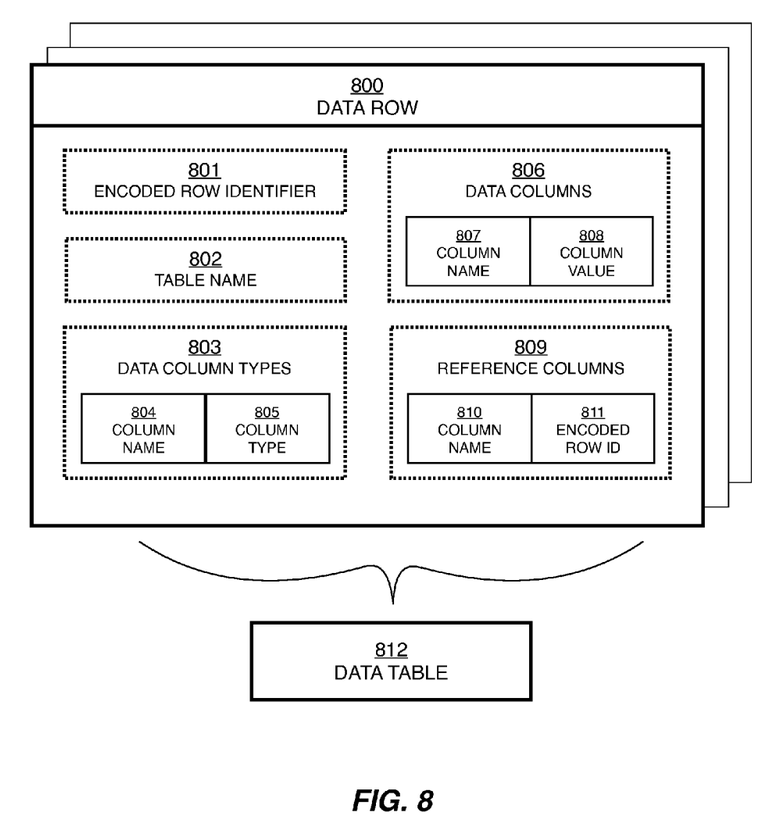
FIG. 8 depicts the storage format used for data transport in FIG. 1.

FIG. 8 depicts the storage format used for data transport in FIG. 1. The transport representation of data is provided through data rows 800 containing the encoded row identifier 801 and table name 802 as properties. Additionally, a data row 800 contains three collections of tuples.

The first such collection is that of data column types 803, mapping a table column name 804 to a descriptive column type 805, such as an "integer". The second collection is the data columns 806, which map table column names 807 to raw data 808, such as an integer value itself. The third and final collection is the reference columns 809, containing table column names 810 mapped to encoded row identifiers 811 generated as through FIG. 6.

These data rows 800 are grouped together per their database table in simple named lists known as data tables 812. The reconstructable sequences 305 of these data tables 812 arranged in FIG. 7 are the basis for the transportable data files used in the transport input/output subsystem 203. In the exemplary embodiment, these data tables 812 are serialized to binary XML and compressed using LZ77 and Huffman coding. These steps are reversed prior to importation to regenerate the arranged data tables 812.

Figure 9:
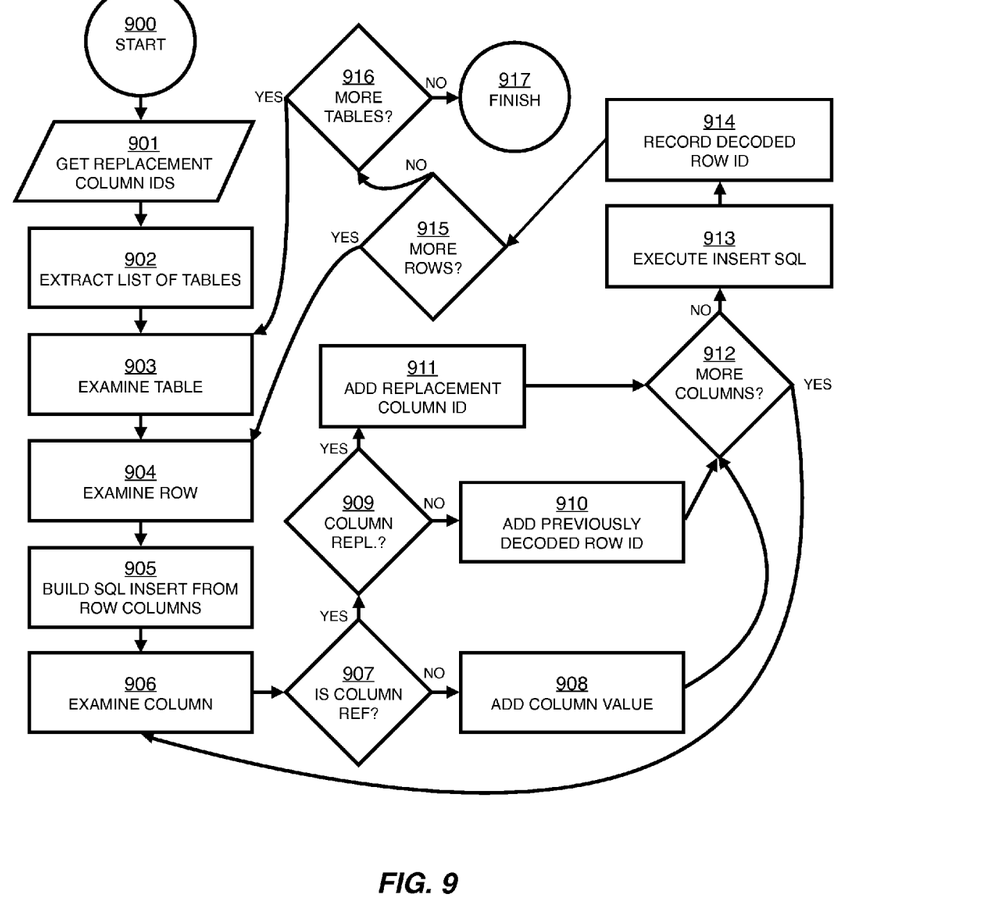
FIG. 9 illustrates the decoding and reconstruction of data rows during data import.

FIG. 9 illustrates the flow of activity during the data import phase. Upon starting 900, the import subsystem 206 accepts optional replacement column identifiers 901 (stored as table-column-id triplets) to be used in attaching multiple "graft points" during importing as well as the grafting root table for later matching. The arranged list of tables 812 is extracted 902 and the first table is examined 903. The rows of the table are enumerated and then each row is analyzed 904 in order to build 905 a suitable SQL database instruction for the target database 104.

Each row column in examined 906 and, tested 907 for whether the column is a data column 806, the raw value 808 is built into the SQL operation according to the column type 805. If the column is, instead, a reference column 809, the particular column is checked 909 for matching a previously provided 901 replacement identifier, building 911 into the SQL the replacement identifier if found. Otherwise, the encoded identifier is matched (decoded) to find the row identifier newly generated by the target database 104 and this new identifier is built 910 into the SQL command.

After preparing the SQL for the column, the process is repeated 912 if more columns remain. After the SQL for all columns have been prepared, the SQL statement is executed against the target database 104 and the resulting newly generated row identifier is recorded 914 for later use as their relation is indicated 910. The database row generation is repeated 915 for all rows in the table, continuing 916 on to each sequential table in order to reconstruct the data in the source database 103 with an entirely new set of row identifiers. The process finishes 917 by returning the new row identifier for the root table provided in 901.

Storage of Computer Programs

As explained above, the present invention preferably is implemented or embodied in computer software (also known as a "computer program" or "code"; we use these terms interchangeably). Programs, or code, are most useful when stored in a digital memory that can be read by a digital processor. We use the term "computer-readable storage medium" (or alternatively, "machine-readable storage medium") or the like to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media. In some cases, for example a simple text document or "flat file," a digital computing system may be able to "read" the file only in the sense of moving it, copying it, deleting it, emailing it, scanning it for viruses, etc. In other words, the file may not be executable on that particular computing system (although it may be executable on a different processor or computing system or platform.

Computer Program Product

Where a program has been stored in a computer-readable storage medium, we may refer to that storage medium as a computer program product. For example, a portable digital storage medium may be used as a convenient means to store and transport (deliver, buy, sell, license) a computer program. This was often done in the past for retail point-of-sale delivery of packaged ("shrink wrapped") programs. Examples of such storage media include without limitation CD-ROM and the like. Such a CD-ROM, containing a stored computer program, is an example of a computer program product.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method comprising the steps of:
  accessing a data table in a source relational database management system (RDBMS);
  selecting a row of the table, the row including columnar data; and
  encoding the row for export; wherein encoding the row includes—
    determining dependent data referenced in the row;
    generating portable row identifier substitutes; and
    collecting the row data and the dependent data referenced in the row to form export data, except for dependent data stored in a table designated for exclusion;
  arranging the export data, utilizing the portable row identifier substitutes in lieu of the original identifiers, into a reconstructable sequence; and then
  importing the export data into a target database according to the reconstructable sequence;
  wherein encoding the row for export includes:
    generating a unique secure listing of the portable row identifier substitutes corresponding to the original identifiers in the data for export;
    receiving parameters from a source client including an initial row identifier and table to export;
    encoding the initial row for export;
    repeating exporting additional rows until no more rows require exporting—bottomed out what is referenced and referencing;

arranging the exported rows into a list in the reconstructable sequence for progressive reconstruction; and
converting the list of rows into an external storage format;
wherein each row encoding step includes:
skipping export of the row in the case that export parameters indicate ignoring the corresponding table;
creating an encoded row identifier which is unique and traceable to the table and the original row identifier;
in the case that the encoded row identifier is used, skipping export of the row;
fetching the columnar data of the exporting row from the source database;
processing the columnar data into an internal representation;
determining relations to and from the exporting row;
examining each row referenced by the exporting row, and for each referenced row—
IF—a referenced row is from an ignored table, storing a dummy value in the internal representation for later detection during import;
ELSE—exporting the row and storing the corresponding encoded row identifier into the internal representation;
examining each row that references the exporting row, and
exporting each such referencing row.

2. The method of claim 1 and further comprising determining dependent data for export, the determining step including, for each exporting row:
receiving the exporting row's table name as a parameter;
accessing metadata of the source database to retrieve columns for all tables referenced by the exporting row's table;
examining the referenced table column and, IF the table is the same as that of the exporting row, skipping the column; ELSE including the column among the dependent data.

3. The method of claim 2 and further comprising:
accessing metadata of the source database to retrieve selected columns for all tables that reference the exporting row's table;
for each referencing table column, examining the referencing table column and, IF the table is the same as that of the exporting row, skipping the column; ELSE including the column among the dependent data.

4. The method of claim 3 wherein the encoding key is generated using a pseudo-random number generator.

5. The method of claim 3 wherein the encoding key is generated using a pseudo-random number generator and a current timestamp.

6. The method of claim 3 wherein encoding a row for export includes:
combining together the export row's table name, encoding key and row identifier to form a text string; and
utilizing the text string as input to a message digest process to create a binary message digest; and then
converting the binary message digest into an ASCII text format using a binary to text encoder to complete the key generation.

7. The method of claim 2 wherein and further comprising reconstructing the encoded rows of data in the target database.

8. The method of claim 1 wherein generating the portable row identifier substitutes includes:
generating an encoding key;
maintaining the encoding key as persistent throughout the export of all rows during the export phase; and
omitting the encoding key from the exported file for security.

* * * * *